US006307196B1

(12) United States Patent
Thompson et al.

(10) Patent No.: US 6,307,196 B1
(45) Date of Patent: Oct. 23, 2001

(54) DETECTION CIRCUIT HAVING A VARIABLE IMPEDANCE CIRCUIT

(75) Inventors: John Thompson, Macclesfield; Raymond Filippi; Joakim Bängs, both of Swindon, all of (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/439,742

(22) Filed: Nov. 15, 1999

(30) Foreign Application Priority Data

Nov. 18, 1998 (GB) .................................................. 9825304

(51) Int. Cl.[7] .................................................. H01J 40/14
(52) U.S. Cl. .................................. 250/214 A; 250/214 R
(58) Field of Search ........................... 250/214 A, 214 R, 250/214 LA, 214 LS; 330/308, 59

(56) References Cited

U.S. PATENT DOCUMENTS

| 4,623,786 | 11/1986 | Rodwell | 250/214 A |
|---|---|---|---|
| 4,808,810 | 2/1989 | Van Doorn | 250/214 A |
| 4,819,071 * | 4/1989 | Nakamura | 358/213.16 |
| 5,130,667 | 7/1992 | Chang et al. | 330/253 |
| 5,532,471 | 7/1996 | Khorramabadi et al. | 250/214 A |
| 5,592,124 | 1/1997 | Mullins et al. | 330/308 |
| 5,606,282 | 2/1997 | Yoshida | 330/51 |
| 5,679,953 | 10/1997 | Ananth et al. | 250/338.1 |

FOREIGN PATENT DOCUMENTS

| 3218 439 A1 | 12/1983 | (DE) . |
|---|---|---|
| 0 402 044 A2 | 12/1990 | (EP) . |
| 0433646 A | 6/1991 | (EP) . |
| 0643496 A1 | 3/1995 | (EP) . |
| 720 311 | 7/1996 | (EP) . |
| 745 868 | 12/1996 | (EP) . |
| 2 233 525 A | 1/1991 | (GB) . |
| 2 247 798 A | 3/1992 | (GB) . |
| WO 95 02278 | 1/1995 | (WO) . |

* cited by examiner

Primary Examiner—Que T. Le
(74) Attorney, Agent, or Firm—Jenkens & Gilchrist, P.C.

(57) ABSTRACT

A photodiode detection circuit using a transimpedance amplifier circuit is disclosed. Overload current from the photodiode is diverted away from the amplifier to a voltage supply, e.g. ground, through an overload protection diode connected in series with the photodiode. A differential structure is also disclosed.

16 Claims, 4 Drawing Sheets

DETECTION CIRCUIT HAVING A VARIABLE IMPEDANCE CIRCUIT

TECHNICAL FIELD OF THE INVENTION

This invention relates to a detection circuit, in particular a circuit which produces a voltage signal which depends on the intensity of light in an incident optical signal.

BACKGROUND OF THE INVENTION

Detection circuits are known, which include a photodiode detector, which produces a current proportional to the intensity of incident light. The circuits further include a transimpedance amplifier circuit, which converts this current into an output voltage. For example, U.S. Pat. No. 5,030,925 shows a detection circuit of this type.

A recognised problem with detection circuits of this type is that the input light signal intensity, and hence the photodiode current, which is proportional thereto, can vary over a very wide dynamic range. For example, it may be necessary to handle input signals which vary over several orders of magnitude. Without special attention to the design values of the impedances at the amplifier input, the wide dynamic range of inputs to the amplifier would cause problems in producing output signals which are sufficiently large to be useful at low signal levels, while still producing output signals for large input signal levels which the circuit can handle without saturating or limiting.

U.S. Pat. No. 5,708,392 discloses a detection circuit with a limiting transimpedance amplifier (TIA) circuit, in which the amplifier circuit has a feedback resistor with a diode coupled across the resistor. Thus, at high signal levels, the diode conducts the input current, and limits the output voltage to a level below that which would cause saturation of the output stage of the amplifier. TIA amplifiers which use diodes across their input/output must handle the overload current in their output stage, and this requires larger transistors with more capacitance. Thus these designs are more complex and require more silicon area when fabricated in an integrated circuit.

Further, EP-A-0745868 discloses a detection circuit having a photodiode detector and a transimpedance amplifier. In order to be able to handle excessive input currents during an initial detection phase, the optodiode is connected to ground through a further diode, and is also connected to a positive voltage supply through an RC network.

SUMMARY OF THE INVENTION

The present invention relates to a detection circuit which, in preferred embodiments, can handle high overload currents, and in particular can handle persistent high overload currents.

Advantageously, the detection circuit of the present invention may include an overload protection diode, connected in series with a detection photodiode, and connected to a supply voltage by means of a low AC impedance, flat frequency response connection. The connection point between the overload protection diode and detection photodiode feeds a transimpedance amplifier, and the input impedance of the transimpedance amplifier is preferably adjusted to match the impedance of the overload protection diode at a cutoff signal current. For signal currents lower than the cutoff, most of the current is applied to the transimpedance amplifier, whereas, for signal currents higher than the cutoff, most of the current is diverted away from the transimpedance amplifier through the overload protection diode.

This has the advantage that the amplifier design may be simplified.

DETAILED DESCRIPTION OF PREFERRED EMBODIMENTS

Figure 1:
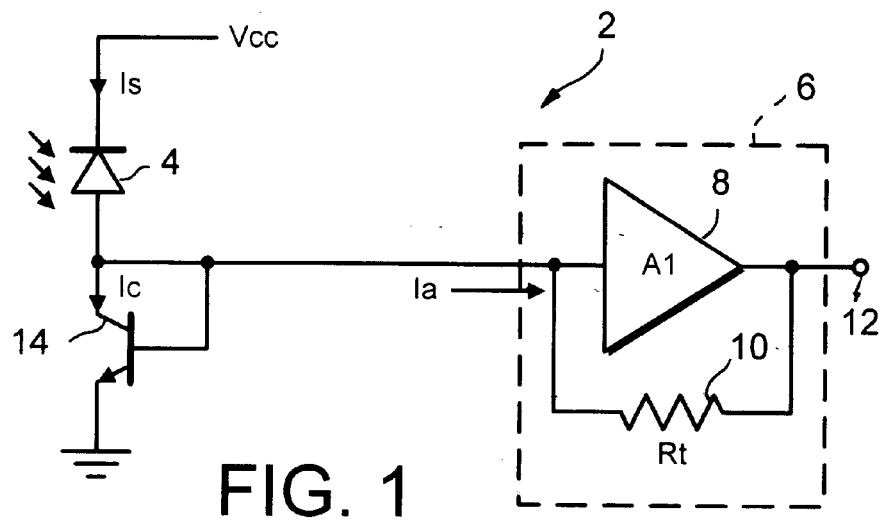
FIG. 1 is a schematic circuit diagram of a first detection circuit in accordance with the invention.

FIG. 1 shows a detection circuit 2. A detection photodiode 4 is positioned to detect incident light signals, which may, for example, be signals contained in light output from an optical fibre. Typically, the optical fibre may be carrying a digital signal, made up of logical "ones" and "zeroes". The light intensity of a logical "one" may be ten times the intensity of a logical "zero". However, the light levels may vary over a very wide range. The detection circuit may receive signals from optical fibres connected to transmitters with widely varying powers. Further, the detection circuit may be used in conjunction with long or short optical fibres, which have correspondingly varying degrees of attenuation of optical signals. Thus, taking these two things together, the intensity of a logical "zero" may vary by several orders of magnitude.

The detection photodiode 4 is connected in reverse bias directly to a positive voltage supply Vcc in this illustrated embodiment, but may in principle be connected thereto by any connection which has a low impedance at DC and AC and a generally flat frequency response.

The action of the detection photodiode is to draw a signal current Is, which is directly proportional to the incident light intensity.

The anode of the detection photodiode 4 is connected to a transimpedance amplifier circuit 6, which includes a transimpedance amplifier 8 and a feedback resistor 10. The form of circuitry which makes up the transimpedance amplifier circuit 6 is known in itself. The amplifier 8 has a gain of A1, and the resistor 10 has a resistance value Rt. The output of the transimpedance amplifier circuit 6 forms a detection circuit output at an output terminal 12.

The gain of the amplifier is largely independent of input signal level, while, as mentioned above, the signal current Is can vary over an extremely wide range. For example, the signal current may be as low as a few nanoamps to as high as a few milliamps. Therefore, if it is to have an acceptably wide dynamic range, the detection circuit 2 needs to be able to deal with overload currents at high input signal levels.

In accordance with the invention, overload currents are handled by an overload protection diode, which, in this illustrated embodiment of the invention, takes the form of an NPN transistor 14, with its collector and base terminals connected together and to the anode of the photodiode 4, and its emitter terminal connected to ground.

The resistance Re of the transistor 14, in the collector-emitter conduction path, is an inverse function of the current Ic therethrough. Thus, at low currents, the transistor 14 has a high resistance, but at higher currents the resistance reduces. More specifically, the resistance is given by:

$$Re = Vt/Ic$$

where Vt is the diode thermal voltage, about 25 mV at room temperature.

Meanwhile, the transimpedance amplifier circuit 6 has an input impedance Ra which is generally constant, and which is largely determined by the gain A1 of the amplifier 8 and the resistance value Rt of the resistor 10. To a first approximation, the input impedance is given by:

$$Ra = Rt/A1$$

One part Ia of the signal current flows into the transimpedance amplifier circuit 6 and the remainder Ic flows into the overload protection diode 14, in proportions which depend on the relative magnitudes of the transimpedance amplifier circuit input impedance Ra and the overload protection diode dynamic resistance Re.

In some situations, it may be advantageous to insert a capacitor between the anode of photodiode 4 and input of the amplifier 6, so that the amplifier may be biased separately to suit the circuit implementation and the available supplies.

The transimpedance amplifier circuit input impedance can be adjusted, by suitable choice of the resistance value Rt and amplifier gain A1, such that overload currents above a certain level are preferentially passed to the overload protection diode. For example, the input impedance can be designed to equal the diode resistance at a particular current, which then acts as a cutoff current. At lower currents, most of the signal current passes to the amplifier; at higher currents, most of the signal current passes to ground through the overload protection diode.

In one preferred embodiment, Rt=6 k$\Omega$, and A1=30, giving an input impedance of 200$\Omega$. Re=200$\Omega$ when Ic=125 $\mu$A.

At lower optical signal levels, and hence lower photodiode currents, most of the photodiode current passes into the amplifier. In that case, the differential output voltage Vout, resulting from changes to the photodiode current between optical signals which represent a "one" and a "zero", depends on the amplifier input current and the resistance value Rt of the feedback resistor 10. Defining the photodiode current for an optical signal representing a "one" as Is1, and that a for an optical signal representing a "zero" as Is0, and taking the limiting case where all of the photodiode current passes to the amplifier input, the differential output voltage is given by:

$$Vout = Rt \cdot (Is1 - Is0)$$

Where, for example, the photodiode current for an optical signal representing a "one" is 10 $\mu$A, and that for an optical signal representing a "zero" is 1 $\mu$A, and where Rt=6 k$\Omega$, Vout=54 mV.

At higher optical signal levels, and hence higher photodiode currents, most of the photodiode current passes into the overload protection diode because the resistance of the overload protection diode is lower than the input impedance of the transimpedance amplifier. For example, the photodiode current for an optical signal representing a "one" may be 5 mA, and that for an optical signal representing a "zero" may be 500 $\mu$A. (Where the overload protection diode current is 5 mA, its resistance is 5$\Omega$, which compares with an amplifier impedance of 200$\Omega$ in the example mentioned above.) In that case, the differential output voltage Vout, resulting from changes to the photodiode current between optical signals which represent a "one" and a "zero", depends on the increase in the base-emitter voltage of the transistor, caused by the increased current therethrough. This increased base-emitter voltage is then amplified by the amplifier.

Again defining the photodiode current for an optical signal representing a "one" as Is1, and that for an optical signal representing a "zero" as Is0, and taking the limiting case where all of the photodiode current passes to the overload protection diode, the differential output voltage is given by:

$$Vout = A1 \cdot Vt \cdot \log_e\left(\frac{Is1}{Is0}\right) = A1 \cdot Vt \cdot \log_e 10 \cdot \log_{10}\left(\frac{Is1}{Is0}\right)$$

Since the photodiode current for an optical signal representing a "one" is generally ten times that for an optical signal representing a "zero", as discussed previously, and with A1=30 as before, then, at room temperature, Vout=1800 mV.

Thus, between the two cases described above, although input signal levels increased by a factor of (5 mA/10 $\mu$A)=500, output signal levels increased only by a factor of (1800 mV/54 mV)=33.

Thus, at high signal currents, the resistance of the diode falls, and more of the signal current flows into the diode, rather than into the transimpedance amplifier circuit. This adjustment takes place automatically, as the signal current varies. Overload protection is thus provided, increasing the dynamic range of the detection circuit. Moreover, because the connection to the supply has a low impedance at both AC and DC, the detection circuit can handle both high frequency transient overloads and persistent, that is low frequency, overloads.

Figure 2:
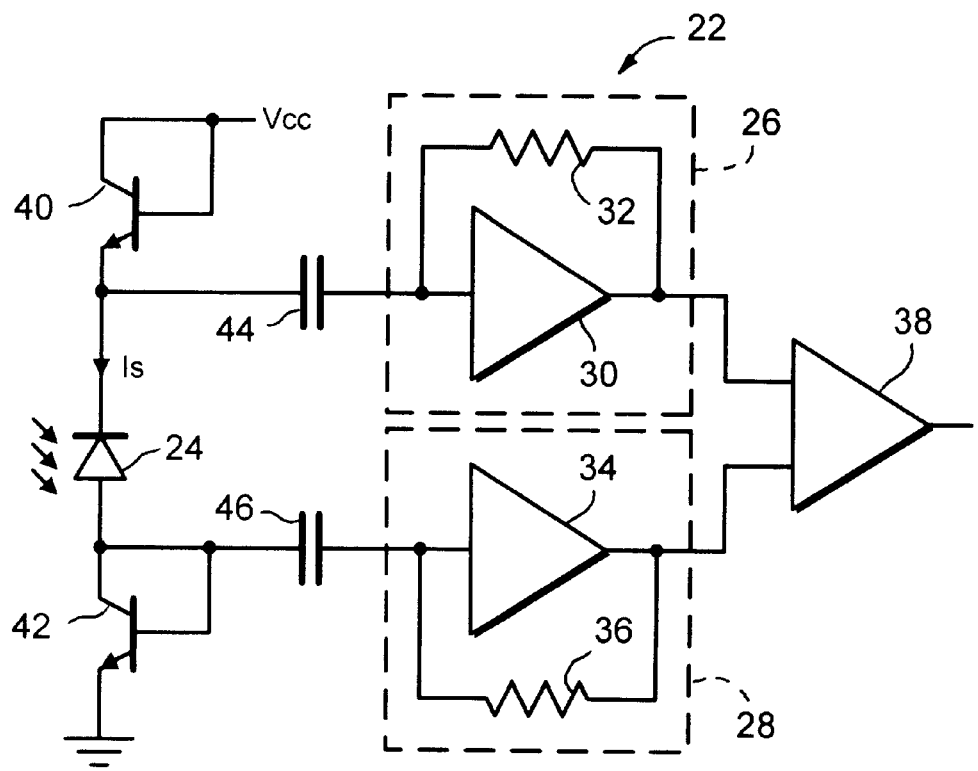
FIG. 2 is a schematic circuit diagram of a second detection circuit in accordance with the invention.

FIG. 2 shows an alternative detection circuit 22 in accordance with the invention, in which a detection photodiode 24 is connected in reverse bias between a positive voltage supply Vcc and ground and, again, draws a signal current Is dependent on the intensity of incident light.

However, in this embodiment, a differential transimpedance amplifier structure is used. More specifically, a first transimpedance amplifier circuit 26 is connected to the cathode of the photodiode 24, and a second transimpedance amplifier circuit 28 is connected to the anode of the photodiode 24. The first transimpedance amplifier circuit 26 includes an amplifier 30 and resistor 32, and the second transimpedance amplifier circuit 28 includes an amplifier 34 and resistor 36. The two transimpedance amplifiers are matched, having the same schematics and matched layouts. The outputs from the first and second transimpedance amplifier circuits are passed to a differential circuit gain block 38, which produces a differential output signal.

Respective overload protection diodes, again formed from NPN transistors 40, 42 with their bases and collectors connected together, are connected to the cathode and anode of the photodiode 24. The diode 40 is connected directly to a positive voltage supply Vcc, while the diode 42 is connected directly to ground.

Further, since the inputs to the two amplifier circuits 26, 28 must be at the same DC voltage, their respective input signals from the photodiode are AC coupled through respective capacitors 44, 46 at the amplifier circuit inputs.

Advantageously, the circuit 22 shown in FIG. 2 may be integrated on a single chip. Alternatively, the overload protection diodes may be external to a chip containing the rest of the detection circuit.

Thus, as before, at high signal currents, the resistance of the overload protection diodes 40, 42 falls, and more of the signal current Is flows into the overload protection diodes, rather than into the transimpedance amplifier circuits 26, 28.

The circuits of FIGS. 1 and 2 represent presently preferred embodiments of the invention. In general, the overload protection diode or diodes can be replaced by any circuit block or component having an impedance which varies with the current passing therethrough.

Figure 3:
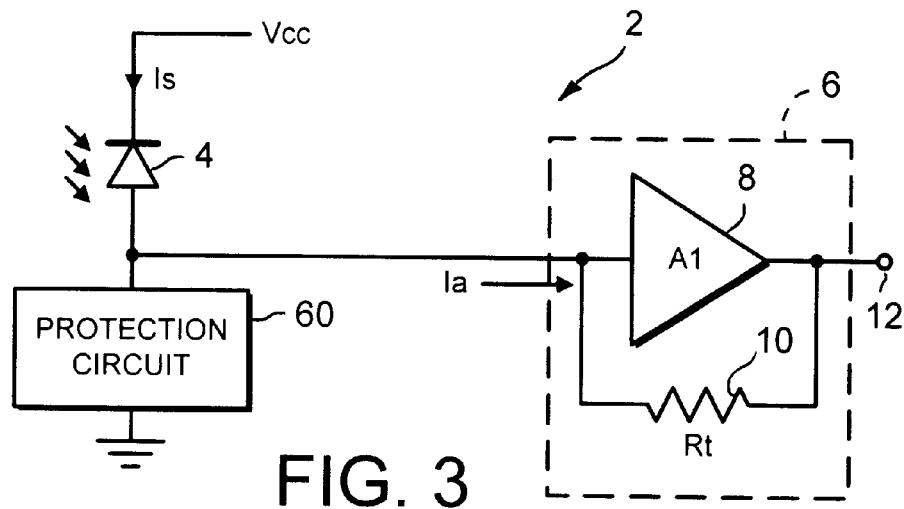
FIG. 3 is a schematic circuit diagram of a third detection circuit in accordance with the invention.

FIG. 3 is a circuit diagram of a device which is generally similar to the device of FIG. 1 (in which the same reference numerals indicate the same components), in which the overload protection diode 14 is replaced by a protection circuit 60.

As before, in some situations, it may be advantageous to insert a capacitor between the anode of photodiode 4 and input of the amplifier 6, so that the amplifier may be biased separately to suit the circuit implementation and the available supplies.

Figure 4:
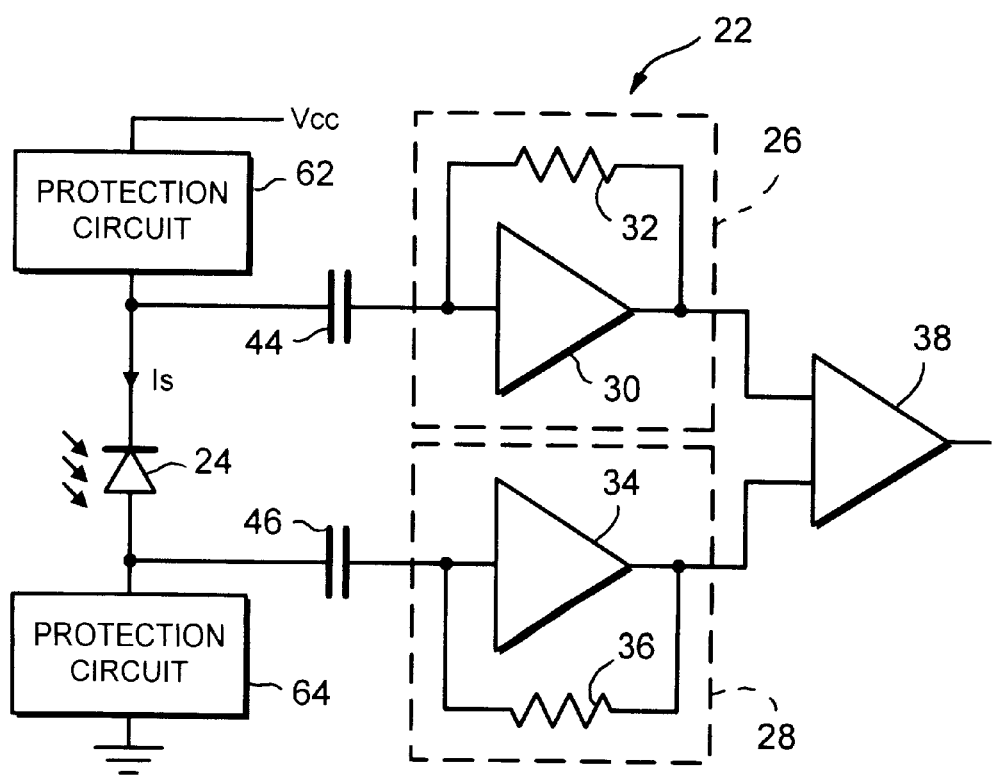
FIG. 4 is a schematic circuit diagram of a fourth detection circuit in accordance with the invention.

Similarly, FIG. 4 is a circuit diagram of a device which is generally similar to the device of FIG. 2 (in which the same reference numerals indicate the same components), in which the overload protection diodes 40, 42 are replaced by protection circuits 62, 64.

Figure 5:
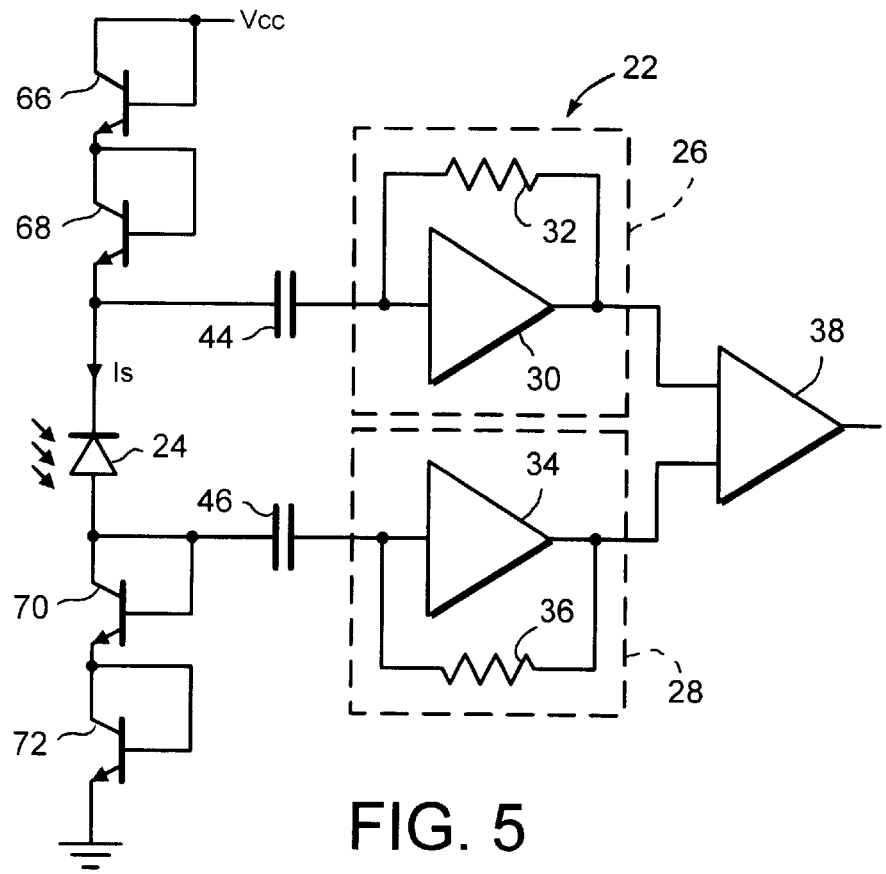
FIG. 5 is a schematic circuit diagram of a fifth detection circuit in accordance with the invention.

For example, in some situations, it may be advantageous to increase the headroom available for the transimpedance amplifier circuit. In that case, as shown in FIG. 5, the protection circuits 62, 64 may take the form of respective pairs of series connected diodes 66, 68 and 70, 72.

Figure 6:
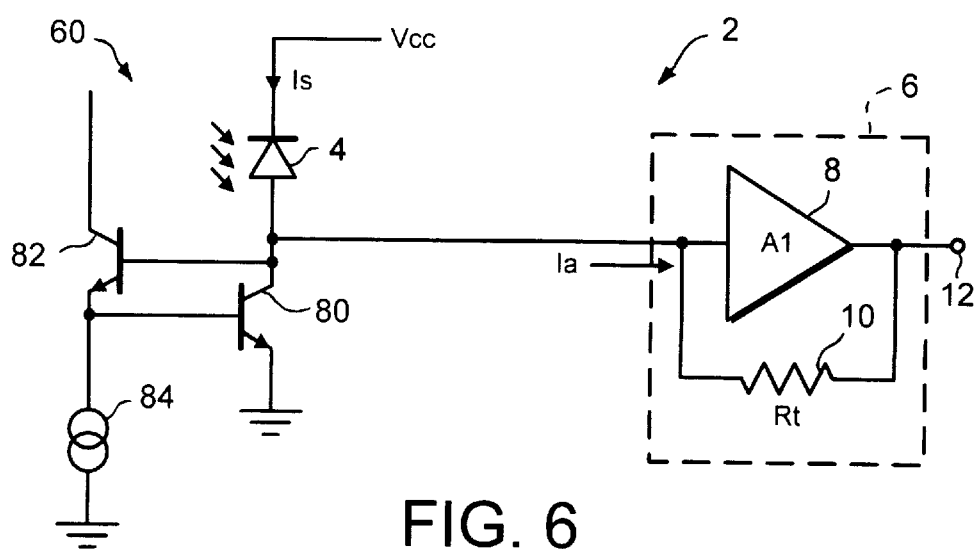
FIG. 6 is a schematic circuit diagram of a sixth detection circuit in accordance with the invention.
Figure 7:
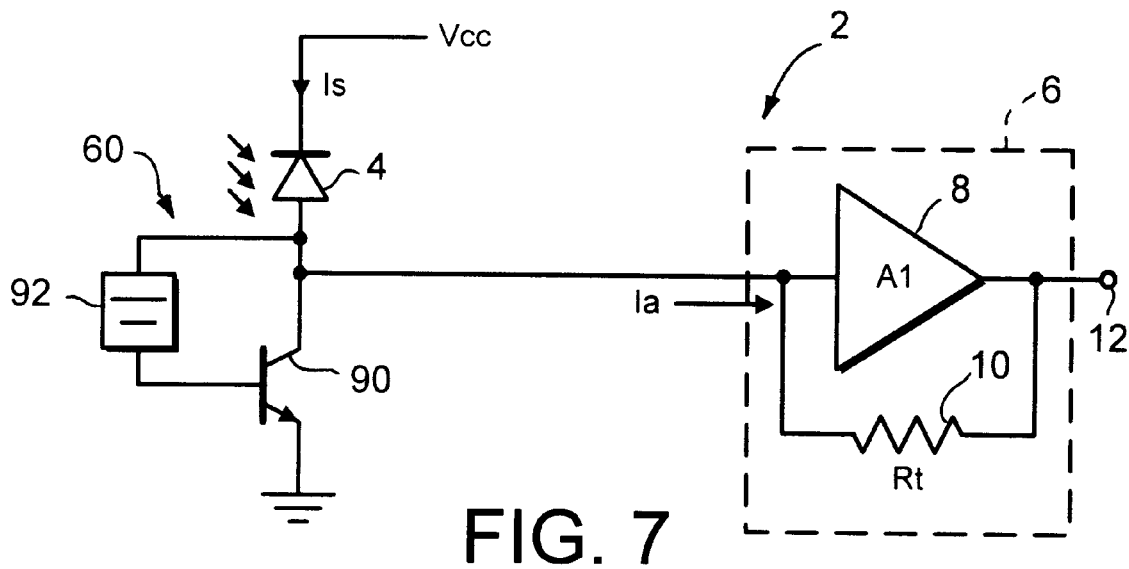
FIG. 7 is a schematic circuit diagram of a seventh detection circuit in accordance with the invention.

FIGS. 6 and 7 show further circuits, in which the protection circuits take different forms. In both cases, these circuits are based on the circuit of FIG. 3, and components which are the same as those in FIG. 3 are indicated by the same reference numerals, and will not be described further.

In the circuit of FIG. 6, the protection circuit 60 includes an NPN transistor 80, having its collector terminal connected to the anode of the photodiode 4, and its emitter terminal connected to ground. A further NPN transistor 82 has its base terminal connected to the collector of the transistor 80, and its emitter terminal connected to the base of the transistor 80. The emitter terminal of the transistor 82 is also connected to ground through a current source 84. This circuit allows the bias level to be set such that, at high photodiode currents, much of the current is diverted to ground.

In the circuit of FIG. 7, the protection circuit 60 includes an NPN transistor 90, having its collector terminal connected to the anode of the photodiode 4, and its emitter terminal connected to ground. A low impedance reference voltage source 92 is connected between the base and collector terminals of the transistor 90. This allows the voltage at the anode of the photodiode 4 to be set to a desired level. Moreover, the reference voltage source 92 can be designed to give the circuit a desired temperature coefficient.

Figure 8:
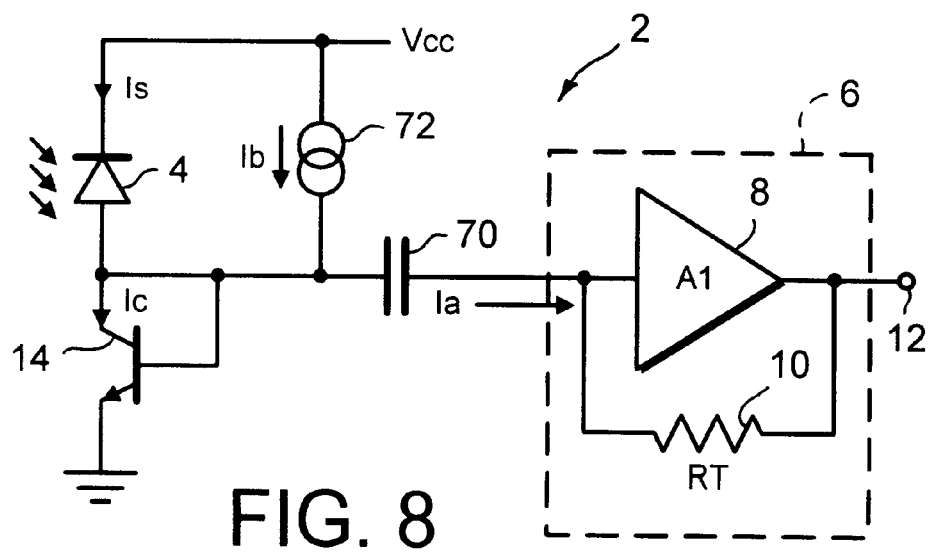
FIG. 8 is a schematic circuit diagram of an eighth detection circuit in accordance with the invention.

FIG. 8 shows a further detection circuit in accordance with the invention. Again, the device is generally similar to the device of FIG. 1 (in which the same reference numerals indicate the same components). In this case, the circuit includes an AC coupling capacitor 70, which has previously been described but not illustrated, connected between the anode of photodiode 4 and input of the amplifier 6.

In addition, a source 72 of constant current Ib is connected between the positive voltage supply rail and the anode of photodiode 4. The bias current Ib increases the current in the overload protection diode 14 independent of the photodiode current, which means that, comparing an input "one" and an input "zero", the ratio of currents in the overload protection diode (and hence the differential output voltage) is reduced in the overload case.

This same principle can be used in double-ended circuits. For example, in the circuit of FIG. 2, a current source can be connected in parallel with the photodiode 24. Alternatively, a first current source can be connected between the positive voltage supply rail and the anode of the photodiode 24 while a second current source is connected between the ground supply rail and the cathode of the photodiode 24.

The detection circuits have been described so far herein using diodes formed from bipolar transistors. It will be appreciated that BiCMOS or CMOS implementations are equally possible.

There is thus described a circuit which reacts dynamically to high input signal levels to divert overload currents away from the amplifier, to achieve a wide dynamic range of the detection circuit.

What is claimed is:

1. A detection circuit, comprising:
   a photodiode, which draws a current which depends on the intensity of a light signal incident thereon;
   a variable impedance circuit connected in series with the photodiode, and being connected to the photodiode at a connection node, the impedance of the variable impedance circuit depending on the current therethrough;
   a transimpedance amplifier circuit, including a transimpedance amplifier and a feedback circuit, and having an input and an output, the transimpedance amplifier circuit input being connected to the connection node, and the transimpedance amplifier circuit output forming a detection circuit output;
   the series connection of the variable impedance circuit and the photodiode being connected between a pair of voltage supply rails by a connection having a low impedance at AC and DC, wherein
   the input impedance of the transimpedance amplifier circuit matches the impedance of the variable impedance circuit at a cutoff current, and is high compared to the impedance of the variable impedance circuit at an overload current.

2. A detection circuit as claimed in claim 1, wherein the feedback circuit of the transimpedance amplifier circuit comprises a resistor.

3. A detection circuit as claimed in claim 1, further comprising a capacitor connected between the transimpedance amplifier circuit input and the connection node.

4. A detection circuit as claimed in claim 1, wherein the variable impedance circuit comprises an overload protection diode.

5. A detection circuit as claimed in claim 4, wherein the overload protection diode comprises a bipolar transistor with base and collector connected together.

6. A detection circuit as claimed in claim 4, wherein the overload protection diode is connected directly to one voltage supply rail.

7. A detection circuit, comprising:
   a photodiode, which draws a current which depends on the intensity of a light signal incident thereon, the photodiode being connected between first and second connection nodes;

a first variable impedance circuit connected between the first connection node and a first voltage supply rail by a connection having a low impedance at AC and DC;

a second variable impedance circuit connected between the second connection node and a second voltage supply rail by a connection having a low impedance at AC and DC; and a differential transimpedance amplifier circuit, including first and second transimpedance amplifier circuits each having an input and an output, the first transimpedance amplifier circuit input being connected through a first capacitor to the first connection node, the second transimpedance amplifier circuit input being connected through a second capacitor to the second connection node, and the first and second transimpedance amplifier circuit outputs forming inputs to a differential amplifier to provide a detection circuit output;

the input impedances of the transimpedance amplifier circuits being high compared to the impedance of the variable impedance circuits at an overload current.

8. A detection circuit as claimed in claim 7, wherein each transimpedance amplifier circuit has a feedback circuit comprising a resistor.

9. A detection circuit as claimed in claim 7, wherein each variable impedance circuit comprises an overload protection diode.

10. A detection circuit as claimed in claim 9, wherein each overload protection diode comprises a bipolar transistor with the respective base and collector connected together.

11. A detection circuit as claimed in claim 9, wherein each overload protection diode is connected directly to the respective voltage supply rail.

12. A detection circuit, comprising:

a photodiode, which draws a current which depends on the intensity of a light signal incident thereon, the photodiode being connected between first and second connection nodes;

a first variable impedance circuit connected between the first connection node and a first voltage supply rail by a connection having a low impedance at AC and DC, the impedance of the first variable impedance circuit depending on the current therethrough;

a second variable impedance circuit connected between the second connection node and a second voltage supply rail by a connection having a low impedance at AC and DC, the impedance of the second variable impedance circuit depending on the current therethrough; and a differential transimpedance amplifier circuit, including first and second transimpedance amplifier circuits each having an input and an output, the first transimpedance amplifier circuit input being connected through a first capacitor to the first connection node, the second transimpedance amplifier circuit input being connected through a second capacitor to the second connection node, and the first and second transimpedance amplifier circuit outputs forming inputs to a differential amplifier to provide a detection circuit output; wherein the input impedances of the transimpedance amplifier circuits match the impedances of the variable impedance circuits at a cutoff current, and are high compared to the impedances of the variable impedance circuits at an overload current.

13. A detection circuit as claimed in claim 12, wherein each transimpedance amplifier circuit has a feedback circuit comprising a resistor.

14. A detection circuit as claimed in claim 12, wherein each variable impedance circuit comprises an overload protection diode.

15. A detection circuit as claimed in claim 14, wherein each overload protection diode comprises a bipolar transistor with the respective base and collector connected together.

16. A detection circuit as claimed in claim 14, wherein each overload protection diode is connected directly to the respective voltage supply rail.

* * * * *